E. P. GLEASON,
Assignor to E. P. GLEASON MANUFACTURING CO.
GAS LIGHTING TORCH.
No. 10,160. Reissued July 18, 1882.
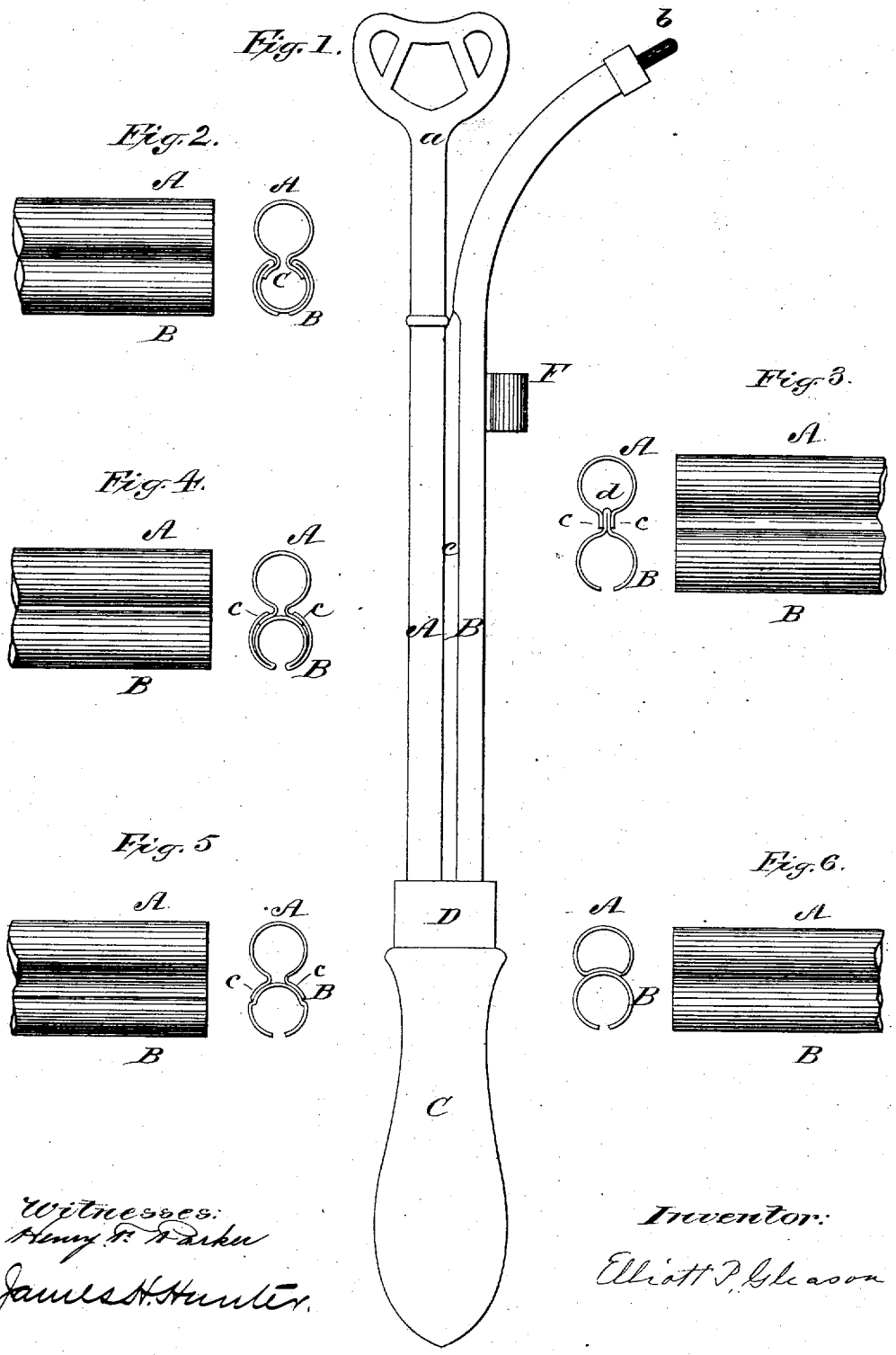
Witnesses:
Henry F. Parker
James H. Hunter.
Inventor:
Elliott P. Gleason
N. PETERS. Photo-Lithographer. Washington. D. C.

UNITED STATES PATENT OFFICE.

ELLIOTT P. GLEASON, OF BROOKLYN, ASSIGNOR TO E. P. GLEASON MANUFACTURING COMPANY, OF NEW YORK, N. Y.

GAS-LIGHTING TORCH.

SPECIFICATION forming part of Reissued Letters Patent No. 10,160, dated July 18, 1882.

Original No. 241,798, dated May 24, 1881. Application for reissue filed June 19, 1882.

*To all whom it may concern:*

Be it known that I, ELLIOTT P. GLEASON, of Brooklyn, Kings county, New York, have invented, made, and applied to use Improvements in the Construction of Gas-Lighting Torches; and I do hereby declare that the following is a full, clear, and correct description of the same, reference being had to the accompanying drawings, making part of this specification, and to the letters of reference marked thereon, in which—

Figure 1 is a view of a gas-lighting torch constructed in accordance with my improvement. Figs. 2, 3, 4, and 6 are modifications of the mode of uniting the key and taper-tubes. Fig. 5 is a view showing the manner of uniting the tubes shown in Fig. 1.

In the drawings like parts of the invention are designated by the same letters of reference.

The nature of the present invention consists in improvements in the construction of gas-lighting torches, as more fully hereinafter set forth.

Heretofore in the manufacture of gas-lighting torches of the class to which the present invention relates a single tube in which the taper was contained has been combined with a separate tube, upon the upper end of which a key employed to turn the cock of the gas-chandelier was placed, either by continuing the metal of which the tube was composed or forming the key separately and uniting it to this tube. In the use of a gas-lighting torch so constructed it has been found that where the cock of the gas-chandelier turned with difficulty or required considerable effort to turn it the key supported by the single tube was apt to be twisted or turned out of position, and the tube supporting it was apt to be turned out of shape, and in some instances broken. To re-enforce this tube and strengthen it to withstand the strain arising from difficulty in turning the cock of the gas-chandelier is the object of the present invention.

To enable those skilled in the art to make and use my invention, I will describe the same.

In Figs. 1 and 5 the mode preferably availed of is illustrated.

A shows the tube to support the key *a*; B, the tube to receive the taper *b*. C is a handle for supporting both tubes, the bases of which are inserted firmly in a collar, D, upon the upper end of the handle.

In the manufacture of the tube A, which is usually done by passing the metal through a series of dies properly constructed, the metal is continued to form the projecting wings *c*, extending the entire length of the tube A to the point where tubes A and B separate, within which wings the projecting side or portion of the tube B is received and fits snugly, and around the outside of which the wings extend, enveloping, as it were, this portion of the tube B. The key *a*, with its support, is then attached to the upper end of the tube A, and the tubes A and B are inserted in the collar D and handle C. After being so placed, the tubes A and B are united by soldering them together, so that a close joint is formed, and the tube A is thus re-enforced and strengthened.

In Fig. 2 a modification of the invention is shown in which the tube A is continued to form wings *c*, which enter a tube, B, formed by folding back the metal upon itself to make a double-walled tube, as shown.

In Fig. 3 the tube A is provided with the wings *c*, and the metal of which the tube B is formed is continued and flattened down, as shown, to form a tongue-piece, *d*, which is received and riveted within the wings *c*.

In Fig. 4 the tube A is shown as provided with the wings *c*, over which the turned-back portion of the tube B slides, the wings *c* being received within that portion of the tube B.

In Fig. 6 one side of the tube A is flattened and recessed to receive a portion of the tube B, resting in the same.

In the modifications shown the object of the invention is fully carried out.

Having now set forth my invention, what I claim as new is—

The combination of a key-tube, A, provided with the wings *c*, and a taper-tube, B, with a handle, C, all constructed and operating substantially as and for the purpose specified.

ELLIOTT P. GLEASON.

Witnesses:

JAMES H. HUNTER,

BERTIE H. MARSHALL.